US012798516B2

(12) United States Patent
Mok

(10) Patent No.: US 12,798,516 B2
(45) Date of Patent: Nov. 17, 2026

(54) PORTABLE ROD VEHICLE LOCK

(71) Applicant: Wing Hei Victor Mok, Hong Kong (CN)

(72) Inventor: Wing Hei Victor Mok, Hong Kong (CN)

(*) Notice: Subject to any disclaimer, the term of this patent is extended or adjusted under 35 U.S.C. 154(b) by 0 days.

(21) Appl. No.: 18/985,104

(22) Filed: Dec. 18, 2024

(65) Prior Publication Data

US 2026/0167147 A1 Jun. 18, 2026

(51) Int. Cl.
*B60R 25/09* (2013.01)
*E05B 73/00* (2006.01)

(52) U.S. Cl.
CPC .......... *B60R 25/09* (2013.01); *E05B 73/0005* (2013.01); *Y10T 70/5841* (2015.04)

(58) Field of Classification Search
CPC ....... B60R 25/09; B60T 3/00; Y10T 70/5841; Y10T 70/40; Y10T 70/411; E05B 2047/0094; E05B 73/0005
See application file for complete search history.

(56) References Cited

U.S. PATENT DOCUMENTS 3,687,238 A * 8/1972 Carpenter ................ B60T 3/00 188/32
3,695,071 A * 10/1972 West ..................... B60R 25/093 70/225
4,819,462 A * 4/1989 Apsell ................... B60R 25/093 70/226
4,913,265 A * 4/1990 Richards .............. B60R 25/093 70/226
5,134,868 A * 8/1992 Bethards .............. B60R 25/093 70/226
5,137,121 A * 8/1992 Leonard .................... B60T 3/00 70/226
5,214,944 A * 6/1993 Wolthoff .............. B60R 25/093 403/219
5,385,038 A * 1/1995 Walker ..................... B62H 5/14 70/226
5,410,897 A * 5/1995 Edmondson .......... B60R 25/093 70/237
5,520,034 A * 5/1996 Edmondson ............ B60R 25/09 70/237

(Continued)

FOREIGN PATENT DOCUMENTS

GB 2278326 A * 11/1994 ........... B60R 25/093
GB 2573567 A * 11/2019 ........... B60R 25/093
JP H11124017 A * 5/1999

*Primary Examiner* — Christine M Mills
*Assistant Examiner* — Faria F Ahmad
(74) *Attorney, Agent, or Firm* — Jose Cherson Weissbrot

(57) ABSTRACT

A portable rod vehicle lock comprises a set of locking rods that rotate relative to a shaft for unlocking and locking through the rotational movement. When unlocked, the two locking rods can be rotated to an overlapping position via the shaft and significantly reduce the size of the lock for easy storage and portability. During the locking process, the two locking rods are also rotated around the shaft to extend, and the butt portions on the locking rods engage with the tire tread to form a stable triangular locking structure. The structure effectively stops the rotation of the wheel, and the operation is very convenient. Moreover, the entire lock will not contact the rim of the wheel during locking, preventing any damage to the rim surface.

8 Claims, 3 Drawing Sheets

(56) References Cited

U.S. PATENT DOCUMENTS

| | | | | | |
|---|---|---|---|---|---|
| 5,689,981 | A * | 11/1997 | DeLuca | B60R 25/09 | 70/237 |
| 5,724,839 | A * | 3/1998 | Thering | B60R 25/09 | 70/226 |
| 5,833,034 | A * | 11/1998 | Banholzer | B60R 25/09 | 70/226 |
| 5,887,462 | A * | 3/1999 | Stone | B62H 3/08 | 70/237 |
| 6,116,062 | A * | 9/2000 | Markegard | B60R 25/093 | 70/237 |
| 6,125,672 | A * | 10/2000 | Diez | B60R 25/093 | 70/237 |
| 6,581,954 | B2 * | 6/2003 | Chadwick | B60D 1/52 | 280/491.1 |
| 6,829,914 | B2 * | 12/2004 | Bullock | B60R 25/00 | 70/238 |
| 6,938,734 | B2 * | 9/2005 | Curl | B60R 25/09 | 70/226 |
| 7,107,802 | B2 * | 9/2006 | Clarke | B60R 25/093 | 70/226 |
| 7,264,092 | B2 * | 9/2007 | Jette | B65G 69/005 | 188/32 |
| 7,753,177 | B2 * | 7/2010 | Slager | B60T 3/00 | 188/4 R |
| 8,297,894 | B1 * | 10/2012 | Williams | B60P 3/077 | 410/7 |
| 8,499,899 | B2 * | 8/2013 | Scott | B60T 3/00 | 188/4 R |
| 8,662,803 | B2 * | 3/2014 | Bowman | B60P 3/075 | 410/9 |
| 10,246,905 | B2 * | 4/2019 | Al-Kahwati | E05B 47/0004 | |
| 11,813,973 | B2 * | 11/2023 | Seale | B60P 3/077 | |
| 12,319,258 | B2 * | 6/2025 | Turner | B60T 3/00 | |
| 12,344,192 | B2 * | 7/2025 | Witchey | B60R 25/096 | |
| 2005/0252258 | A1 * | 11/2005 | Peacock | B60R 25/093 | 70/226 |
| 2005/0284707 | A1 * | 12/2005 | Morris | B60T 3/00 | 188/36 |
| 2007/0050999 | A1 * | 3/2007 | Milner | B65G 69/2882 | 33/286 |
| 2021/0086722 | A1 * | 3/2021 | Davis | B60R 25/09 | |
| 2025/0206256 | A1 * | 6/2025 | Gordon | B60R 25/20 | |
| 2025/0222896 | A1 * | 7/2025 | Gordon | B60R 25/09 | |
| 2025/0222906 | A1 * | 7/2025 | Kavanagh | B60R 25/09 | |
| 2025/0313174 | A1 * | 10/2025 | Witchey | B60R 25/096 | |

* cited by examiner

PORTABLE ROD VEHICLE LOCK

FIELD OF THE INVENTION

The present invention relates to a locking device, particularly a portable rod vehicle lock used for locking the tire of a vehicle.

BACKGROUND OF THE INVENTION

Existing vehicle locks are difficult to use, have limited functions and safety risks, are bulky, and use traditional locking techniques. When operating and using, they are easy to damage the tire rims and are difficult to store the car lock after use, etc.

SUMMARY OF THE INVENTION

The purpose of the present invention is to provide a portable rod vehicle lock which can be folded to reduce size for easy storage and portability when not in use. When locking, the user only needs to unfold the locking rod through the shaft and fix it with the wheel, which is easy to operate and can reduce damage to the rim surface of the wheel.

This invention is achieved through the following technical solutions:

A portable rod vehicle lock, comprising at least a set of locking rods rotating relative to a shaft, the free end of a locking rod I is provided with a butt portion in contact with a tread of a tire, and a locking rod II is provided with butt portions in contact with the tread of the tire, which one is located at a free end and one is located close to the shaft; when the lock is locked, the two locking rods generate an angle around the shaft to engage three butt portions of the locking rod I and the locking rod II to contact with the tread of the tire; and the internal angles of the triangle, which are formed by connection points of the three butt portions with the tread of tire, are less than 90°, and the locking rod I and the locking rod II are locked by the locking mechanism.

Further, the locking rod I and the locking rod II are configured to be telescopically adjustable and lockable in length, and the distance between the two butt portions of the locking rod II varies with the length changes.

Further, the locking rod I and the locking rod II are provided with a steel cable inside for locking the length of the telescopic configuration.

Further, the locking rod I and the locking rod II are respectively set at two ends of the shaft.

Further, the locking rod II is set to be a locking base placed on the ground, and the locking rod I is mounted to the locking base by the shaft.

Further, a blocking wall for stopping the vehicle lock disassembling in the axial direction of a wheel is provided on one side of the locking base opposite to where the locking rod I is provided on the locking base; the blocking wall is arranged on the locking base and/or the butt portion of the locking rod I and/or the shaft; the distance between the blocking wall and the locking rod I is greater or equal to the axial thickness of the tire.

Further, the locking mechanism is a device located at the shaft to lock the rotation of the shaft.

Further, the locking mechanism is a connecting rod which connects the locking rod I and the locking rod II.

Further, a control circuit is provided, which comprises at least a drive module for driving the locking mechanism and a wireless communication module for communicating with an external device, an output of the drive module is connected to an electronic drive component of the locking mechanism.

Further, the control circuit is equipped with a positioning module and/or a solar power supply module.

Compared to the prior art, the beneficial effects of the present invention are as follows: the structure of the entire vehicle lock is relatively simple and can be realized by only two locking rods that rotate relative to each other around the shaft. When unlocked, the two locking rods can be rotated to the overlapping position through the shaft, which can greatly reduce the volume of the entire vehicle lock and make the lock easy to use. collect and carry; when locked, just rotate and unfold the two locking rods around the shaft, and then let the butt portion of the locking rods contact with the tread of the tire to form a stable triangular locking structure, which can prevent the rotation of the wheel and achieve locking. The operation is very convenient, and the entire vehicle lock will not contact with the rim when locked, so it will not cause damage to the rim surface. The vehicle lock can also realize intelligent control by adding an electronic control system, such as an electric locking drive device, positioning module, wireless communication module, etc.

BRIEF DESCRIPTION OF THE DRAWINGS

The present invention will be further described below in conjunction with the accompanying drawings.

DESCRIPTION OF THE EMBODIMENTS

Figure 1:
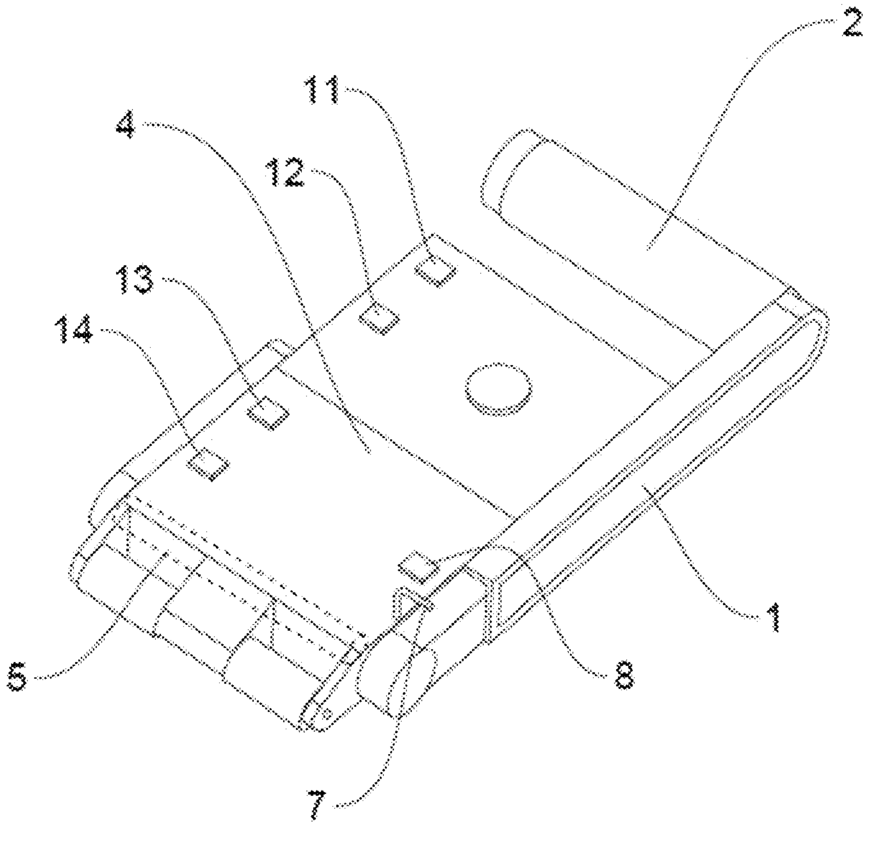
FIG. 1 is a perspective view of the present invention in the folded state.
Figure 2:
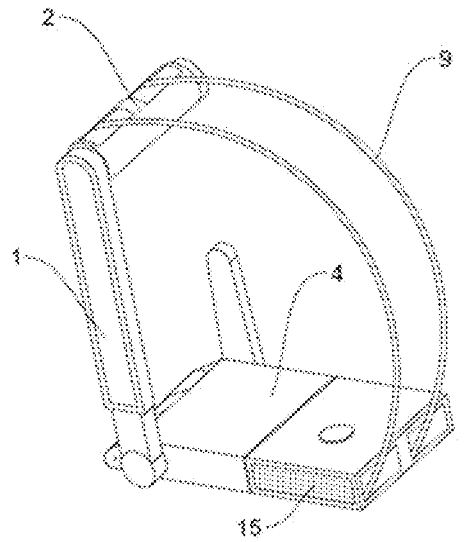
FIG. 2 is a perspective view of the present invention in the deployed state.
Figure 3:
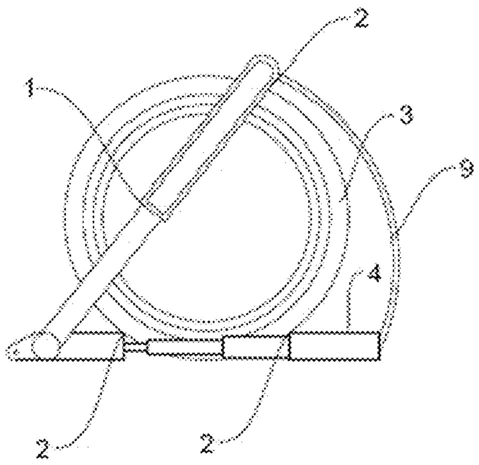
FIG. 3 is a perspective view of the present invention in the locked state.
Figure 4:
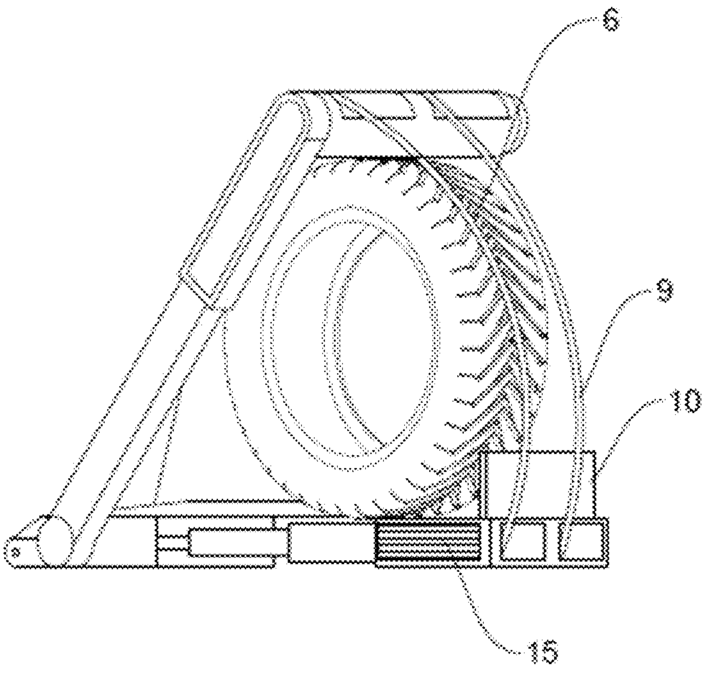
FIG. 4 is a front view of the present invention in the locked state.

Referring to FIG. 1 to 4, the portable rod vehicle lock comprises of a set of locking rods rotating relative to a shaft 5, and facilitates unlocking and locking through the rotation of the locking rods around the shaft 5. The free end of a locking rod I 1 is provided with a butt portion 2 in contact with a tread 6 of a tire 3, and a locking rod II 4 is provided with a butt portion 2 in contact with the tread 6 of the tire 3, which one is located at a free end and one is located close to the shaft 5; when the lock is locked, the two locking rods generate an angle around the shaft 5 to engage three butt portions 2 of the locking rod I 1 and the locking rod II 2 to contact with the tread 6 of the tire 3 to form a triangular locking structure as a whole, and the internal angles of the triangle should be less than 90°. So, it achieves stable and reliable locking and prevents the wheel from disengaging from the locking structure. The locking operation is very convenient. User only needs to turn the locking rod I 1 and II 4 to the locking position, and then lock the angle between them through the locking structure. Moreover, the entire vehicle lock will not contact with the rim when locked, so it will not cause damage to the rim surface. When unlocked, by releasing the locking structure, the locking rods can rotate around the shaft 5 again, the butt portions 2 are separated from the tread 6 of the tire 3, and the vehicle lock can be pulled out from the tire 3, and then the locking rods are unlocked. The locking rods further rotate around the shaft 5 until the two locking rods are overlapping to reduce the size of the lock. So, it can greatly reduce the size of the entire lock, making the lock easy to store and carry.

Since the tires 3 of the vehicle will have different sizes, to make the vehicle lock adapt to the needs of different tires 3 in different sizes and achieve a more compact vehicle lock, the locking rod I 1 and the locking rod II 4 can adopt a telescopic configuration which can adjust and lock the length. When locking, the locking rod 1I 1 and the locking rod II 4 extend to a length suitable for the size of the wheel. Meanwhile, the distance between the two butt portions 2 of the locking rod II 4 also increases. Then unfold the two locking rods, and adjust the length of the two locking rods appropriately so that the butt portions 2 can better contact the tread 6 of the tire 3. Finally, lock the length of the locking rods first, and then use the locking structure to lock the position of the two locking rods in a fixed angle.

To enable the locking rods to automatically adapt to different sizes of vehicle tires 3 and achieve length locking, steel cables 9 are installed inside the locking rod I 1 and the locking rod II 4 for setting length. When unlocked, the steel cables 9 remain relaxed, allowing for convenient adjustment of the locking rods' lengths. The lock is then placed on the wheel, and the two locking rods are adjusted to the appropriate locking angle. First, the locking mechanism 7 locks the angle between the two locking rods, then the steel cables 9 retract to let the three butt portions 2 of the locking rods into contact with the tread 6 of tire and secure the length of the steel cables 9. Once unlocked, the lock can reduce its length by shortening locking rod I 1 and locking rod II 4, further minimizing the overall size of the lock. The retraction of the steel cables 9 can be achieved through a winding mechanism located within the lock.

To facilitate the vehicle lock being placed on the ground for locking during installation and easier to operate, the locking rod II 4 is set as a locking base placed on the ground, and the locking rod I 1 is installed with the locking base through the shaft 5. The locking base can be pulled open through a telescopic setting, at least one side of the locking base is provided with an open for being inserted under the tire 3, and then the telescopic setting of the locking rod I 1 is also pulled open and rotated through the shaft 5 to above the tire 3. Finally, the angle is locked and the telescopic settings of the locking rod I 1 and II 4 are pulled back so that the butt portions 2 are all in contact with the tread 6 to complete the locking.

To prevent the locked vehicle lock from being pulled out along the axial direction of the wheel, the present invention adopts the following structure. First, the locking rod I 1 and the locking rod II 4 are respectively arranged at both ends of the shaft 5. When locked, the locking rod I 1 and the locking rod II 4 form an angle and are respectively located on both sides of the tire 3. Therefore, the vehicle lock cannot be pulled out axially from both sides of the tire 3. Second, if the locking rod II 4 is a locking base structure, a blocking wall 10 for stopping the vehicle lock from disassembling in the axial direction of the wheel is provided on one side of the locking base opposite to where the locking rod I 1 is provided on the locking base; the blocking wall 10 is arranged on the locking base and/or the butt portion 2 of the locking rod I 1 and/or the shaft 5. The effect of preventing the lock from being pulled out along the wheel axial direction is achieved through the locking rod I 1 and the blocking wall 10.

The locking of the portable vehicle lock is mainly achieved by locking the relative angle of the locking rods by the locking structure. To achieve the locking of the angle, it is necessary to design accordingly according to the connection structure between the locking rods and the rotating shaft 5. For example, the locking rods and the rotating shaft 5 can be coupled through gears. In such a case, the locking can be achieved by the relative movement of the gears. For example, the combination of large and small gears to achieve locking, and this structure generally uses the motor to drive the locking rods to rotate relative to the shaft 5 by the gear sets. And, when the motor stops rotating, the small gear is connected to the locking rods or the shaft 5 and the large gear which is coupled with the small gear cannot drive the large gear to rotate due to the small torque generated. When the motor stops running, the angle can be locked. Of course, if it is necessary to achieve more reliable locking, it can also be achieved by locking the gear. The above is only one of the structures that lock the locking rod to rotate, and it is not the only one. For example, a sprocket structure can also be applied, and the corresponding locking structure can also be designed according to the specific driving structure to achieve the locking effect. In addition, the angle between the two locking rods can be locked by connecting rods.

To realize intelligent IoT, so that the user can lock the vehicle lock or know about the locking status through a mobile device such as a mobile phone, the present invention also adds a control circuit 11. The control circuit 11 generally includes a drive module 12 for driving the locking mechanism 7 and a wireless communication module 13 for communicating with peripheral devices. The output of the drive module 12 is connected to the electronic drive component 8 of the locking mechanism 7. The wireless communication module 13 can lock and unlock the vehicle lock through wireless communication, and can also know about the working status of the vehicle lock, etc.

Additionally, to help the user easily monitor the operational status of the vehicle lock, an LED indicator is integrated into the lock. The LED provides various display effects to convey the lock's status, such as using different colors of light to indicate whether the lock is in a locked or unlocked state.

Additionally, since the electronic component of the vehicle lock requires power, a solar power supply module 15 can be integrated to charge the internal battery, ensuring that a low battery does not affect the operation of the various electronic systems.

A GPS positioning module 14 can also be added to the vehicle lock, allowing users to track the lock and the vehicle's location.

What is claimed is:

1. A portable rod vehicle lock, comprising at least a set of locking rods rotating relative to a shaft, a free end of a locking rod I is provided with a butt portion in contact with a tread of a tire, and a locking rod II is provided with a two butt portions, in contact with the tread of the tire, wherein one butt portion of locking rod II is located at a free end of the locking rod II and one other portion of the locking rod II is located close to the shaft; when the lock is locked, the two locking rods generate an angle around the shaft to engage the butt portions of both the locking rod I and the locking rod II, to contact with the tread of the tire; and wherein a triangle, which is formed by connection points of three butt portions with the tread of tire, has internal angles that are less than 90°, and the locking rod I and the locking rod II are locked by a locking mechanism;

wherein the locking rod I and the locking rod II are configured to be telescopically adjustable and lockable in length, and the distance between the two butt portions of the locking rod II varies with the length changes; and wherein the locking rod I and the locking rod II are provided with a steel cable inside for locking the length of the telescopic configuration.

2. The vehicle lock of claim 1, wherein the locking rod I and the locking rod II are respectively set at two ends of the shaft.

3. The vehicle lock of claim 1, wherein the locking rod II is set to be a locking base placed on the ground, and the locking rod I is mounted to the locking base by the shaft.

4. The vehicle lock of claim 3, wherein a blocking wall for stopping the vehicle lock disassembling in an axial direction of the tire is provided on one side of the locking base opposite to where the locking rod I is provided on the locking base; the blocking wall is arranged on the locking base and/or the butt portion of the locking rod I and/or the shaft; the distance between the blocking wall and the locking rod I is greater or equal to an axial thickness of the tire.

5. The vehicle lock of claim 1, wherein the locking mechanism is a device located at the shaft to lock the rotation of the shaft.

6. The vehicle lock of claim 1, wherein the locking mechanism is a connecting rod which connects the locking rod I and the locking rod II.

7. The vehicle lock of claim 1, wherein a control circuit is provided, which comprises at least a drive module for driving the locking mechanism and a wireless communication module for communicating with an external device, an output of the drive module is connected to an electronic drive component of the locking mechanism.

8. The vehicle lock of claim 7, wherein the control circuit is equipped with a positioning module and/or a solar power supply module.

* * * * *